(12) United States Patent
Isaji et al.

(10) Patent No.: US 10,393,983 B2
(45) Date of Patent: Aug. 27, 2019

(54) OPTICAL FIBER RIBBON, OPTICAL FIBER CABLE, AND OPTICAL FIBER

(71) Applicant: FUJIKURA LTD., Tokyo (JP)

(72) Inventors: Mizuki Isaji, Chiba (JP); Ken Osato, Chiba (JP); Naoki Okada, Chiba (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/578,018

(22) PCT Filed: Mar. 9, 2016

(86) PCT No.: PCT/JP2016/057332
§ 371 (c)(1),
(2) Date: Nov. 29, 2017

(87) PCT Pub. No.: WO2016/208228
PCT Pub. Date: Dec. 29, 2016

(65) Prior Publication Data
US 2018/0292623 A1    Oct. 11, 2018

(30) Foreign Application Priority Data
Jun. 22, 2015    (JP) .................................. 2015-124708

(51) Int. Cl.
*G02B 6/44*    (2006.01)

(52) U.S. Cl.
CPC .............. *G02B 6/447* (2013.01); *G02B 6/44* (2013.01); *G02B 6/4482* (2013.01); *G02B 6/4403* (2013.01); *G02B 6/448* (2013.01)

(58) Field of Classification Search
CPC .. G02B 6/4403; G02B 6/4433; G02B 6/4494; G02B 6/4429; G02B 6/02395; G02B 6/44
See application file for complete search history.

(56) References Cited

U.S. PATENT DOCUMENTS

| | | | |
|---|---|---|---|
| 5,379,363 A | 1/1995 | Bonicel et al. | |
| 5,485,539 A | 1/1996 | Mills | |
| 6,404,972 B1 | 6/2002 | Pasch et al. | |
| 6,731,844 B2 | 5/2004 | Conrad et al. | |
| 9,008,478 B2 * | 4/2015 | Matsuzawa .......... | G02B 6/4482 385/114 |

(Continued)

FOREIGN PATENT DOCUMENTS

| CN | 102844694 A | 12/2012 |
|---|---|---|
| CN | 103069322 A | 4/2013 |

(Continued)

OTHER PUBLICATIONS

Office Action issued in Japanese application No. 2015-124708 dated Apr. 19, 2016 (3 pages).

(Continued)

*Primary Examiner* — Jennifer Doan
(74) *Attorney, Agent, or Firm* — Osha Liang LLP

(57) ABSTRACT

An optical fiber ribbon includes a plurality of optical fibers arranged side by side in a width direction. Each of the optical fibers includes a colored section that is colored by an identification color for identifying the optical fiber from the other optical fibers. The respective colored sections of the optical fibers are formed by coloring a portion, in a length direction, of the respective optical fibers according to a common pattern.

12 Claims, 10 Drawing Sheets

(56) References Cited

U.S. PATENT DOCUMENTS

2002/0197032 A1* 12/2002 Conrad ............... G02B 6/4482
                                                                              385/114
2013/0028563 A1    1/2013  Matsuzawa et al.

FOREIGN PATENT DOCUMENTS

| DE | 3208172 A1 | 9/1983 |
|---|---|---|
| JP | H08-062468 A | 3/1996 |
| JP | H09-043463 A | 2/1997 |
| JP | H11-125753 A | 5/1999 |
| JP | H1-513130 A | 11/1999 |
| JP | 2003-232969 A | 8/2003 |
| JP | 2005-123041 A | 5/2005 |
| JP | 2007-178883 A | 7/2007 |
| JP | 2011-175100 A | 9/2011 |
| JP | 2011-221083 A | 11/2011 |
| JP | 2011-227298 A | 11/2011 |
| JP | 4972177 B2 | 7/2012 |
| JP | 5227996 B2 | 7/2013 |
| WO | 2011/132610 A1 | 10/2011 |

OTHER PUBLICATIONS

Office Action in counterpart Canadian Application No. 2,984,129 dated Aug. 2, 2018 (3 pages).
Extended Euroepean Search Report in counterpart European Application No. 16813999.6 dated Jan. 31, 2019 (12 pages).
Office Action in counterpart Chinese Patent Application No. 201680025782.1 dated Mar. 12, 2019 (13 pages).

* cited by examiner

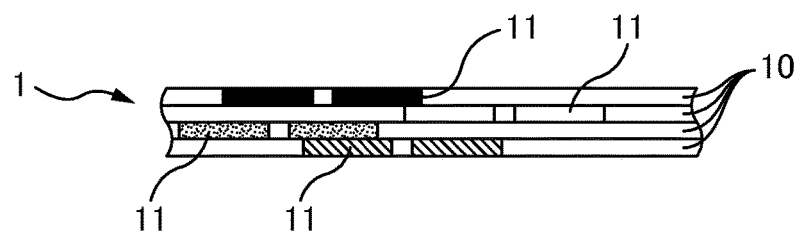
FIG. 4A
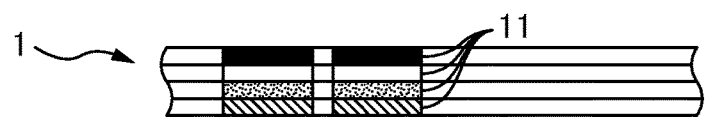
FIG. 4B
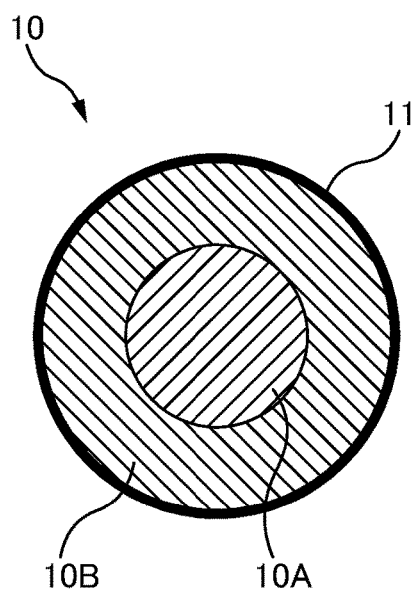 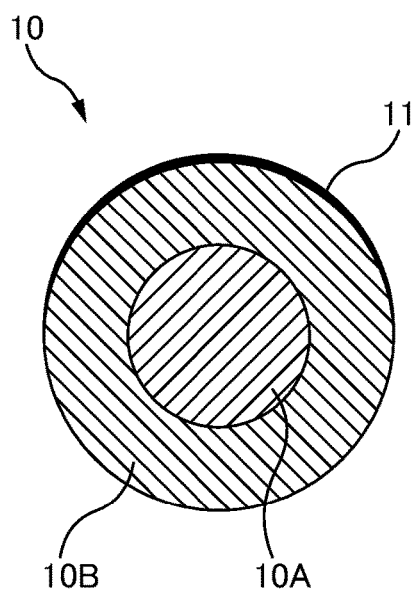
FIG. 5A　　　　　　　　FIG. 5B (COMPARATIVE EXAMPLE)

(CROSS SECTION ALONG B-B)

(CROSS SECTION ALONG C-C)

OPTICAL FIBER RIBBON, OPTICAL FIBER CABLE, AND OPTICAL FIBER

BACKGROUND

Technical Field

The present invention relates to optical fiber ribbons, optical fiber cables, and optical fibers.

Description of the Related Art

Optical fiber ribbons (optical fiber ribbon cords) including a plurality of optical fibers arranged side by side in the width direction are known in the art. Examples of known optical fiber ribbons include: optical fiber ribbons wherein a plurality of optical fibers are connected by being collectively covered altogether by a ribbon-forming material; and intermittently connected optical fiber ribbons wherein connection parts where two adjacent optical fibers are connected with a ribbon-forming material are arranged intermittently. In such optical fiber ribbons, a colored layer is formed over the entire region, in the length direction, of each optical fiber to identify each of the optical fibers (primary-coated optical fibers; jacketed optical fibers) constituting the optical fiber ribbon, and thereby, the optical fibers are color-coded by different colors.

Another known technique is to constitute an optical fiber cable by employing a plurality of optical fiber ribbons. In such optical fiber cables, a mark is formed on the surface of each optical fiber ribbon to distinguish the optical fiber ribbons constituting the optical fiber cable. The mark on the surface of each optical fiber ribbon is formed by the same color.

Patent Literatures 1 and 2 disclose techniques of forming a colored layer on each optical fiber to distinguish the optical fibers, and applying markings to distinguish the optical fiber ribbons. In Patent Literatures 1 and 2, the colored layer is formed over the entire region, in the length direction, of each optical fiber. Further, the mark formed on the surface of each optical fiber ribbon is formed of the same color over the ribbon's width direction.

CITATION LIST

Patent Literature

Patent Literature 1: Japanese Patent No. 5227996
Patent Literature 2: JP 2007-178883A In conventional techniques, a colored layer is formed over the entire region, in the length direction, of each optical fiber to identify each optical fiber constituting an optical fiber ribbon by color. However, the number of colors of coloring inks that can be used is limited, and thus, there is a limit to the number of pieces of optical fibers distinguishable by color. Also, in this technique, it is necessary to prepare coloring ink to form the colored layer over the entire region, in the length direction, of each optical fiber.

Also, after separating an optical fiber from an optical fiber ribbon, it is possible to identify, from the single piece of optical fiber, the number of that optical fiber (the fiber number) within the optical fiber ribbon as well as the number of the optical fiber ribbon (the ribbon number). Unfortunately, in the technique of forming a colored layer over the entire region, in the length direction, of the optical fiber, it is difficult to indicate both the fiber number and the ribbon number only by color, because the number of colors is limited. It is feasible to identify both the fiber number and the ribbon number by a combination of color and markings, but this requires ink for the markings in addition to coloring ink for forming the colored layer over the entire region, in the length direction, of each optical fiber, which leads to an increase in manufacturing cost.

SUMMARY

One or more embodiments of the invention achieve, at low cost, identification of optical fibers constituting an optical fiber ribbon.

One or more embodiments of the invention are directed to an optical fiber ribbon including a plurality of optical fibers arranged side by side in the width direction. Each of the optical fibers includes a colored section colored by an identification color for identifying the optical fiber from the other optical fibers. The respective colored sections of the plurality of optical fibers are formed by coloring a portion, in the length direction, of the respective optical fibers according to a common pattern.

Other features of the embodiments of the invention are disclosed by the description below and the drawings.

One or more embodiments of the invention can achieve, at low cost, identification of optical fibers constituting an optical fiber ribbon.

BRIEF DESCRIPTION OF DRAWINGS

FIG. 4A is a diagram illustrating an example in which the positions of the colored sections 11 are misaligned. FIG. 4B is a diagram illustrating an example in which the positions of the colored sections 11 are aligned;

FIGS. 5A and 5B are cross-sectional views of optical fibers 10 each at a position where the colored section 11 is formed;

DETAILED DESCRIPTION OF EMBODIMENTS

Figure 1:
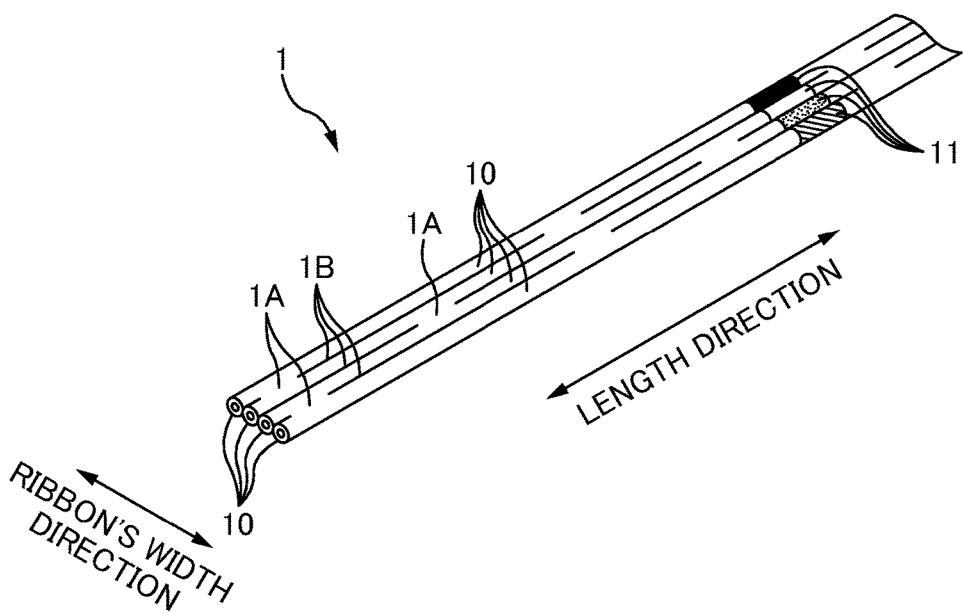
FIG. 1 is a diagram illustrating an optical fiber ribbon 1 according to one or more embodiments.

At least the following matters are disclosed by the description below and the drawings.

According to one or more embodiments, an optical fiber ribbon includes a plurality of optical fibers arranged side by side in the width direction, wherein: each optical fiber includes a colored section that is colored by an identification color for identifying that optical fiber from the other optical fibers; and the respective colored sections of the plurality of optical fibers are each formed by coloring a portion, in the length direction, of the respective optical fiber according to a common pattern. Thus, identification of optical fibers constituting the optical fiber ribbon can be achieved at low cost.

In one or more embodiments, the respective colored sections of the plurality of optical fibers are arranged side by side in the width direction. This facilitates identification of the optical fiber ribbon.

In one or more embodiments, the colored section is formed in a portion, in the circumferential direction, of the optical fiber. This further reduces the area in which the colored section is colored, and thus, the amount of coloring ink used can be further reduced.

In one or more embodiments, each of the optical fibers includes a cover layer formed of a light-transmissive material; and the colored section is formed on the cover layer. This makes the colored section visible through the cover layer.

In one or more embodiments, the respective colored sections of the plurality of optical fibers are formed at least on one surface side of the optical fiber ribbon. This improves identifiability of the optical fiber ribbon.

In one or more embodiments, among the plurality of optical fibers, the colored section of the optical fiber 10 located at an end in the width direction is colored by a tracer color. This allows the optical fiber ribbon to be identified both by the color of the colored section and the pattern, and thereby, identifiability of the optical fiber ribbon is improved.

According to one or more embodiments, an optical fiber cable includes a plurality of optical fiber ribbons, wherein: each optical fiber ribbon includes a plurality of optical fibers arranged side by side in the width direction, each optical fiber including a colored section that is colored by an identification color for identifying that optical fiber from the other optical fibers constituting the same optical fiber ribbon; and the respective colored sections of the plurality of optical fibers constituting the same optical fiber ribbon are each formed by coloring a portion, in the length direction, of the respective optical fiber according to a pattern for identifying that optical fiber ribbon from the other optical fiber ribbons. With this optical fiber cable, identification of optical fibers constituting each optical fiber ribbon can be achieved at low cost.

According to one or more embodiments, an optical fiber includes a colored section that is colored by an identification color for identifying the optical fiber from other optical fibers, wherein the colored section is formed by coloring a portion, in a length direction, of the optical fiber according to a predetermined pattern indicating a ribbon number. With this optical fiber, identification of the optical fiber can be achieved at low cost.

In one or more embodiments, the colored section is formed in a portion, in the circumferential direction, of the optical fiber. This further reduces the area in which the colored section is colored, and thus, the amount of coloring ink used can be further reduced.

{Configuration of Optical Fiber Ribbon 1}

FIG. 1 is a diagram illustrating an optical fiber ribbon 1 according to one or more embodiments. As illustrated in the figure, the optical fiber ribbon 1 includes a plurality of optical fibers 10 arranged side by side in the ribbon's width direction. Herein, "optical fibers 10" encompass jacketed optical fibers and primary-coated optical fibers. The optical fiber ribbon 1 of one or more embodiments is an intermittently connected optical fiber ribbon.

The intermittently connected optical fiber ribbon 1 is an optical fiber ribbon including a plurality of optical fibers 10 (four in this example) arranged side by side and connected intermittently. Two adjacent ones of the optical fibers 10 are connected by a connection part 1A. Between two adjacent optical fibers, a plurality of connection parts 1A are arranged intermittently in the length direction. The plurality of connection parts 1A of the intermittently connected optical fiber ribbon 1 are arranged intermittently and two-dimensionally in the length direction and the ribbon's width direction. Regions other than the connection parts 1A between the two adjacent optical fibers constitute non-connected parts 1B. In the non-connected parts 1B, the two adjacent optical fibers are not restrained. Thus, the intermittently connected optical fiber ribbon 1 can be rolled up into a cylindrical form (a bundle), or folded up, and the multitude of optical fibers 10 can be bundled with high density.

It should be noted that the optical fiber ribbon 1 is not limited to the example illustrated in the figure. For example, the arrangement of the connection parts 1A may be changed. Also, the number of optical fibers 10 constituting the optical fiber ribbon 1 may be changed. Further, the optical fiber ribbon 1 does not have to be an intermittently connected optical fiber ribbon 1 wherein connection parts 1A connected by a ribbon-forming material are arranged intermittently, but may be an optical fiber ribbon wherein a plurality of optical fibers 10 are connected by being collectively covered altogether by a ribbon-forming material (described further below).

As illustrated in FIG. 1, each optical fiber 10 includes a colored section 11. As will be described below, the colored section 11 is formed such that both the fiber number and the ribbon number of the optical fiber 10 can be identified on the basis of its color (identification color) and pattern.

The colored section 11 of each optical fiber 10 is colored by an identification color for identifying that optical fiber 10 from the other optical fibers 10. The identification color is a color corresponding to the number of each optical fiber 10 (fiber number) in the optical fiber ribbon 1. Stated differently, the identification color serves as a color indicating the fiber number. Thus, a worker can identify the fiber number of the optical fiber 10 on the basis of the color of the colored section 11 of that optical fiber 10. Also, even after separating a single piece of optical fiber 10 from the optical fiber ribbon 1, a worker can identify the fiber number of the optical fiber 10 on the basis of the color of the colored section 11 of that single piece of optical fiber 10.

In one or more embodiments, the respective colored sections 11 of the optical fibers 10 are colored by identification colors that are different from one another. In one or more embodiments, the first to fourth optical fibers 10 have colored sections 11 colored in blue, white, brown, and gray, respectively. Thus, if the colored section 11 of an individually separated optical fiber 10 is white, then a worker can identify that the fiber number of that optical fiber 10 is "second".

It should be noted that there are cases where, even if there is an overlap in some of the identification colors, the fiber number can be identified from the colors of the colored sections 11 on the basis of the color arrangement of the colored sections 11. For example, in cases where the first to fourth optical fibers 10 have colored sections 11 colored according to a color arrangement of blue, white, white, and pink, respectively, there is an overlap in the identification color (white) of two optical fibers 10. However, if the colored section 11 of the individually separated optical fiber 10 is white and the colored sections 11 of two remaining optical fibers 10 are white and pink, then a worker can identify that the fiber number of the individually separated optical fiber 10 is "second". Thus, the respective colored sections 11 of the plurality of optical fibers 10 constituting the optical fiber ribbon 1 do not necessarily have to be color-coded all by different identification colors, but an overlap in some of the identification colors is permitted.

Figure 12A:
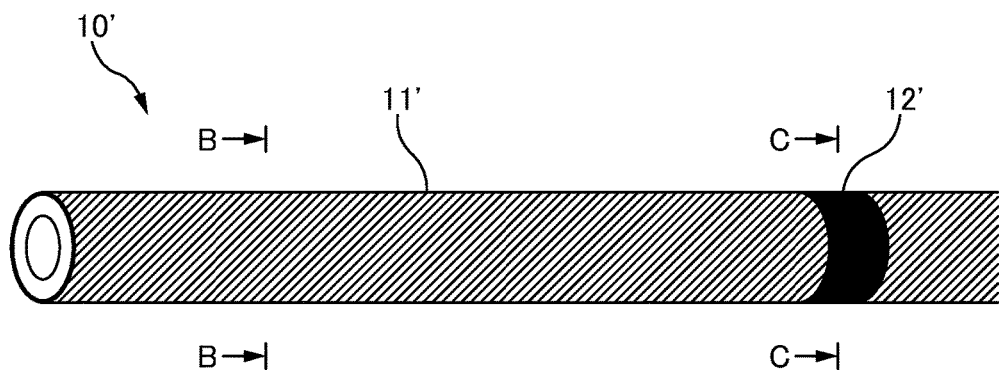
FIGS. 12A to 12C are diagrams illustrating a comparative example (an example in which a colored layer is formed over the entire region in the length direction).
Figure 12B:
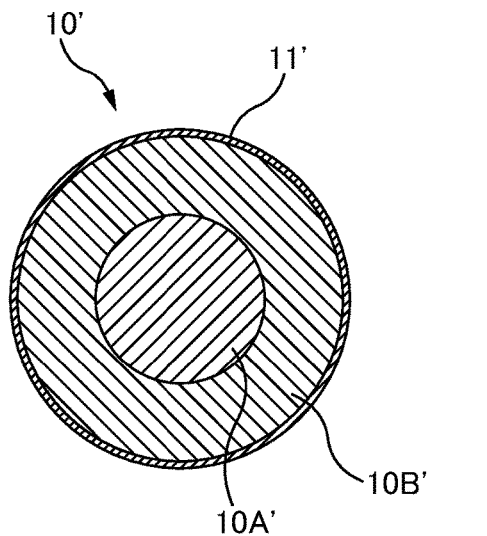
Figure 12C:
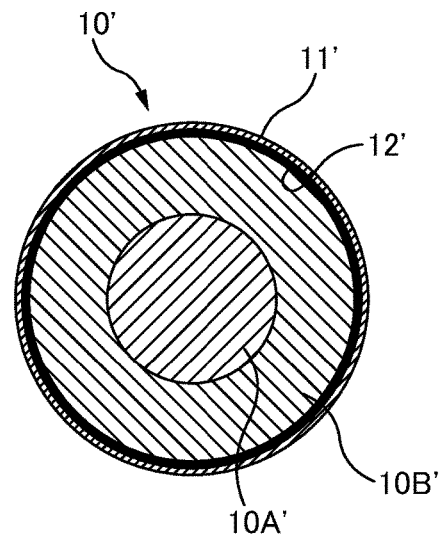

As illustrated in FIG. 1, the colored section 11 is formed by coloring a portion, in the length direction, of each optical fiber. If a colored layer 11' is formed over the entire region, in the length direction, of an optical fiber 10' as illustrated in FIGS. 12A to 12C, it is necessary to prepare coloring ink amounting to the area to be colored. In contrast, one or more embodiments only require a portion in the length direction to be colored. Therefore, the area to be colored—and thus the amount of coloring ink used—can be reduced.

Further, by forming the colored section 11 by coloring a portion in the length direction, the colored section 11 can be formed according to a predetermined pattern. In one or more embodiments, the pattern of the colored section 11 indicates the number of the optical fiber ribbon 1 (i.e., the ribbon number). The colored section 11 is colored in a belt shape over a predetermined length in the length direction, to thereby form a belt-shaped pattern. Note that the pattern of the colored section 11 can be changed in terms of the shape of the colored section 11 (its length in the optical fiber's length direction), the number of colored sections, etc. In cases where there are two or more colored sections 11, the pattern can be changed by changing the interval (pitch) between colored sections 11. Thus, the colored sections 11 can be formed according to various types of patterns depending on the colored section 11's shape, the number of colored sections, the interval therebetween, and a combination of the above. In contrast, if a colored layer 11' is formed over the entire region, in the length direction, of an optical fiber 10' as illustrated in FIGS. 12A to 12C, it is impossible to form patterns with the colored layer 11'. (Thus, a mark 12' such as that illustrated in FIG. 12A becomes necessary separately in order to indicate the ribbon number.)

The respective colored sections 11 of the plurality of optical fibers 10 (four in this example) constituting the same optical fiber ribbon 1 are each formed by coloring a portion, in the length direction, of the respective optical fiber according to a common pattern (identification pattern). For example, in one or more embodiments, as illustrated in FIG. 1, the respective colored sections 11 of the first to fourth optical fibers 10 are formed as a belt-shaped pattern having the same length (e.g., 5 mm) in the length direction. It should be noted that a specific pattern is formed repeatedly on each optical fiber 10 at predetermined intervals (e.g., 15 cm intervals).

Figure 2:
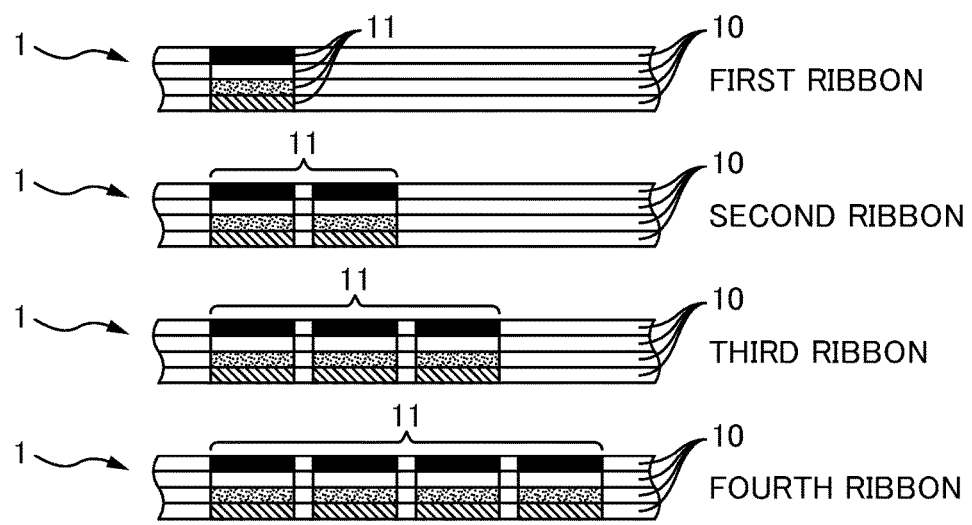
FIG. 2 is a diagram illustrating patterns of four optical fiber ribbons 1.

FIG. 2 is a diagram illustrating patterns of four optical fiber ribbons 1.

As illustrated in the figure, each optical fiber ribbon 1 includes colored sections 11 that are colored according to a pattern for identifying that optical fiber ribbon 1 from the other optical fiber ribbons 1. The pattern of the colored sections 11 of the respective optical fibers 10 corresponds to the number of the optical fiber ribbon 1 (i.e., ribbon number) to which those optical fibers 10 belong. Stated differently, the pattern of the colored sections 11 serves as a pattern indicating the ribbon number. Thus, a worker can identify the ribbon number of each optical fiber ribbon 1 on the basis of the pattern of the colored sections 11 in that optical fiber ribbon 1. For example, when the pattern of the colored sections 11 in an optical fiber ribbon 1 is a pattern including two belts, a worker can identify that the ribbon number of that optical fiber ribbon 1 is "second".

Figure 3:
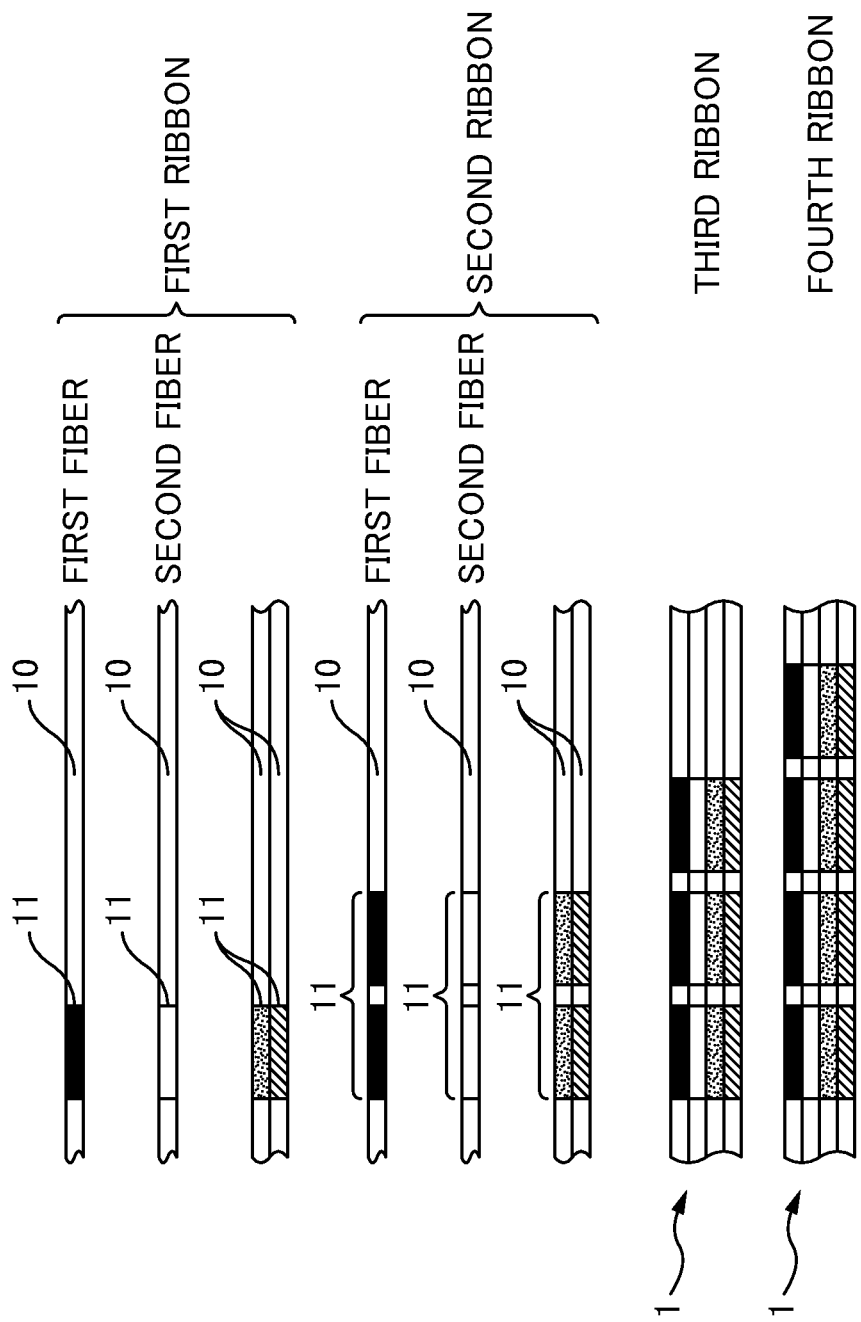
FIG. 3 is a diagram illustrating a state where some optical fibers 10 of first and second optical fiber ribbons 1 have been individually separated.

FIG. 3 is a diagram illustrating a state where some optical fibers 10 of the first and second optical fiber ribbons 1 have been individually separated.

As illustrated in the figure, the respective colored sections 11 of the plurality of optical fibers 10 constituting a certain optical fiber ribbon 1 are each formed by being colored according to a pattern for identifying the certain optical fiber ribbon 1 from the other optical fiber ribbons 1. Thus, even after separating a single piece of optical fiber 10 from the optical fiber ribbon 1, a worker can identify both the fiber number and the ribbon number of the optical fiber 10 on the basis of the color and pattern of the colored section 11 of the single piece of separated optical fiber 10. For example, if the colored section 11 of the individually separated optical fiber 10 has a pattern with two white belts, a worker can identify the optical fiber 10 as the "second fiber in the second ribbon".

In one or more embodiments, the color arrangement of the colored sections 11 in each optical fiber ribbon 1 is the same, but the color arrangement may be varied. In that case, the identification color of the optical fiber 10 located at an end in the width direction of each optical fiber ribbon 1 is a tracer color. For example, in cases where blue is the tracer color indicating the first ribbon and yellow is the tracer color indicating the second ribbon, the color arrangement of the colored sections 11 in the four optical fibers 10 of the first ribbon can respectively be blue, white, brown, and gray, whereas the color arrangement of the colored sections 11 in the four optical fibers 10 of the second ribbon can respectively be yellow, white, brown, and gray. Thus, a worker can identify the ribbon number of each optical fiber ribbon 1 not only from the pattern of the colored section 11, but also from its color, thereby facilitating the worker's identification task. Also, even if the number of patterns of the colored sections 11 is small, the number of identifiable optical fiber ribbons 1 can be increased by employing the colors and patterns of the colored sections 11 in combination.

FIG. 4A is a diagram illustrating an example in which the positions of the colored sections 11 are misaligned. As illustrated in the figure, in cases where the positions, in the length direction, of the colored sections 11 are misaligned, the optical fibers 10 need to be distinguished and observed individually to identify the pattern of the colored sections 11. This impairs the visual recognizability of the pattern of the colored sections 11. Thus, it is difficult, if not impossible, to identify the ribbon number.

FIG. 4B is a diagram illustrating an example in which the positions of the colored sections 11 are aligned. As illustrated in the figure, in cases where the respective colored sections 11 of the plurality of optical fibers 10 are arranged side by side in the width direction, a worker can visually recognize the pattern rendered to the optical fiber ribbon 1, which is an assembly of optical fibers 10, without individually distinguishing and observing the optical fibers 10. Stated differently, by arranging the respective colored sections 11 of the plurality of optical fibers 10 side by side in the width direction, the optical fiber ribbon 1 is provided with an identification pattern (a pattern assembly of the colored sections 11) constituted by the plurality of colored sections 11. Although the identification pattern (pattern assembly of the colored sections 11) is constituted by the plurality of colored sections 11 having different colors, the positions of the colored sections 11 made of a common pattern are aligned. Thus, the pattern is easy to recognize macroscopically as a single identification pattern (a wide pattern). The identification pattern (pattern assembly of the colored sections 11) is wider than each colored section 11, which facilitates identification of the ribbon number.

FIGS. 5A and 5B are cross-sectional views of optical fibers 10 each at a position where the colored section 11 is formed. Each optical fiber 10 includes a glass fiber 10A and a cover layer 10B. The diameter of the glass fiber 10A is approximately 125 µm. The cover layer 10B includes a first cover layer (primary coating) and a second cover layer (secondary coating), and the diameter of the cover layer 10B is approximately 250 µm.

The colored section 11 is formed on the outer circumference of the cover layer 10B (more specifically, the second cover layer). At positions where the colored section 11 is not formed, the cover layer 10B (more specifically, the second cover layer) is exposed. The cover layer 10B is formed of a light-transmissive material, and the colored section 11 is formed of a material that absorbs light more easily than the cover layer 10B.

As illustrated in FIG. 5A, the colored section 11 may be formed over the entire circumference of the optical fiber 10. Forming the colored section 11 in this way allows the colored section 11 to be visually recognized from any position in the circumferential direction of the optical fiber 10.

On the other hand, as illustrated in FIG. 5B, the colored section 11 may be formed only in a portion, in the circumferential direction, of the optical fiber 10. Stated differently, as illustrated in the figure, the colored section 11 does not have to be formed in some portions, in the circumferential direction, of the optical fiber 10. This further reduces the area in which the colored section 11 is colored, and thus, the amount of coloring ink used can be further reduced.

Even when the colored section 11 is formed only in a portion, in the circumferential direction, of the optical fiber 10 as illustrated in FIG. 5B, the colored section 11 can be visually recognized. Because the cover layer 10B is formed of a light-transmissive transparent/translucent material, the colored section 11 is visible through the cover layer 10B, even when the optical fiber 10 is observed from the side where the colored section 11 is not formed.

Also, by not forming the colored section 11 in some portions, in the circumferential direction, of the optical fiber 10, the optical fiber 10 can be prevented from getting damaged. This is described below.

When an optical fiber 10' having a colored layer 11' formed over the entire region along the length direction—as illustrated in FIGS. 12A to 12C—is immersed for a long time in a solvent such as alcohol (ethanol, methanol, etc.), the optical fiber 10' may get damaged. More specifically, the outer circumferential surface of the optical fiber 10' may rupture at the optical fiber's end sections when a worker immerses the optical fiber 10' in a solvent to facilitate the removal of gel adhering to the optical fiber ribbon after extracting the optical fiber ribbon from a loose-tube-type optical cable (described later), and inadvertently leaves the optical fiber in the solvent for a long time. The cause of the rupture is thought to be as follows. When the optical fiber 10' is immersed in a solvent for a long time, the cover layer 10B' gets swollen by the solvent absorbed from the end sections of the optical fiber 10', whereas the colored layer 11' is made of a material having an anti-erosion function (a material having a low solvent-absorption rate) and is less likely to swell. Thus, the swollen cover layer 10B' gets tightly squeezed by the colored layer 11', and eventually, the outer circumferential surface of the optical fiber 10' ruptures. On the other hand, in cases where the colored section 11 is not formed in some portions, in the circumferential direction, of the optical fiber 10 as illustrated in FIG. 5B, even if the cover layer 10B absorbs a solvent and swells, the colored section 11 will not tightly squeeze the swollen cover layer 10B, and thus, the optical fiber 10 can be prevented from getting damaged.

Figure 6:
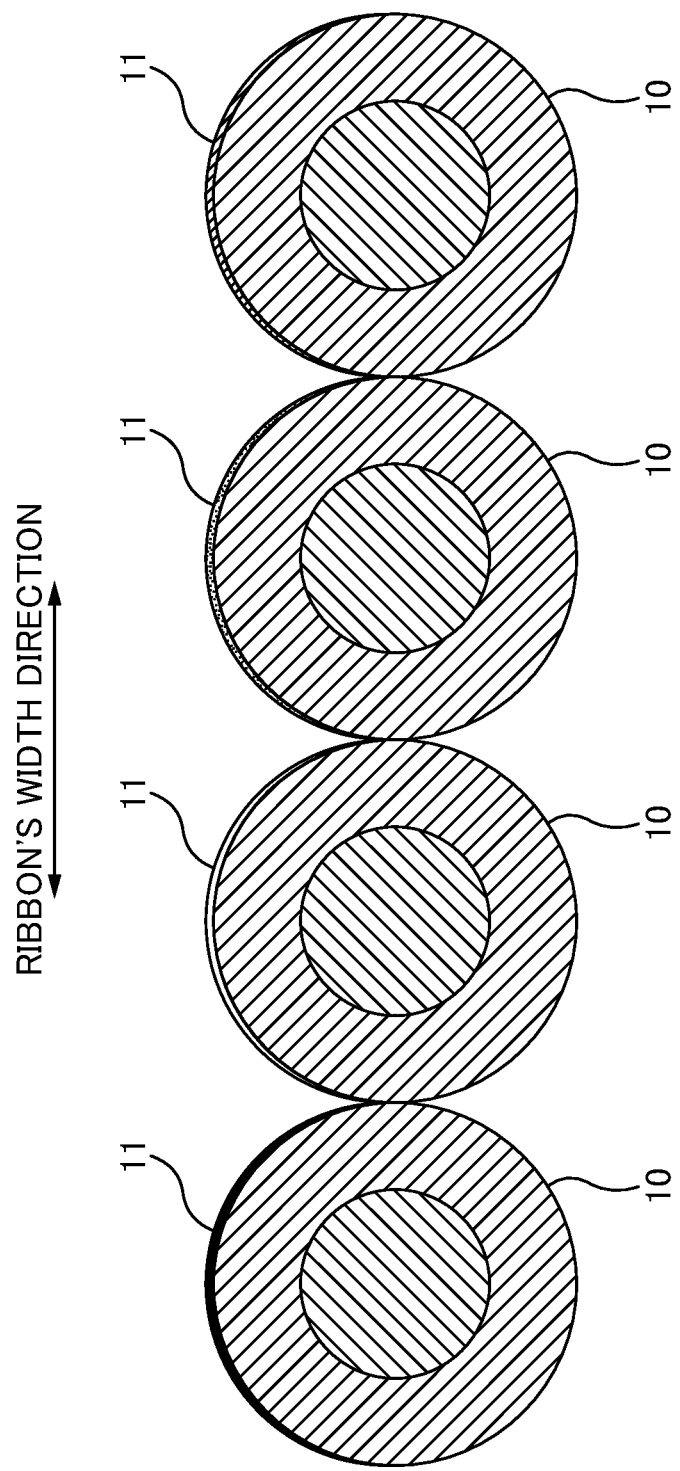
FIG. 6 is a cross-sectional view of an optical fiber ribbon 1 including a plurality of the optical fibers 10 illustrated in FIG. 5B.

FIG. 6 is a cross-sectional view of an optical fiber ribbon 1 including a plurality of the optical fibers 10 illustrated in FIG. 5B. As illustrated in the figure, in cases where the colored section 11 is formed in a portion, in the circumferential direction, of the optical fiber 10, the respective colored sections 11 of the plurality of optical fibers 10 constituting the optical fiber ribbon 1 are formed at least on one surface side (the upper side in the figure) of the optical fiber ribbon 1. Stated differently, the respective colored sections 11 of all of the optical fibers 10 are formed at least on the same surface (the upper surface in the figure) of the optical fiber ribbon 1. This improves visual recognizability of the pattern of the colored sections 11 of the optical fiber ribbon 1.

In one or more embodiments, each optical fiber 10 includes a colored section 11 that is colored by an identification color for identifying that optical fiber 10 from the other optical fibers 10; and the respective colored sections 11 of the plurality of optical fibers 10 are each formed by coloring a portion, in a length direction, of the respective optical fiber 10 according to a common pattern. Thus, both the fiber number and the ribbon number of a certain optical fiber 10 can be identified on the basis of the color and pattern of the colored section 11 of that optical fiber 10. Also, since the coloring area of the colored section 11 is small, the amount of coloring ink used can be reduced.

Further, as illustrated in FIG. 4B, in the optical fiber ribbon 1 of the embodiments, the respective colored sections 11 of the plurality of optical fibers 10 are arranged side by side in the width direction. This provides the optical fiber ribbon 1 with an identification pattern that is wider than the colored section 11 of each optical fiber 10 (i.e., an identification pattern constituted by an assembly of the plurality of colored sections 11 having different identification colors), thereby facilitating identification of the ribbon number.

Further, as illustrated in FIG. 5B, in the optical fiber ribbon 1 of the embodiments, the colored section 11 is formed in a portion, in the circumferential direction, of the optical fiber 10. This can further reduce the area in which the colored section 11 is colored, and thus, the amount of coloring ink used can be further reduced. Also, by forming the colored section 11 in a portion, in the circumferential direction, of the optical fiber 10, the optical fiber 10 can be prevented from getting damaged.

Further, as illustrated in FIG. 5B, in cases where the colored section 11 is formed in a portion, in the circumferential direction, of the optical fiber 10, the colored section 11 is formed on a light-transmissive cover layer 10B. Thus, when the optical fiber 10 is observed from a side where the colored section 11 is not formed, the colored section 11 is visible through the cover layer 10B.

Further, as illustrated in FIG. 6, in cases where the colored section 11 is formed in a portion, in the circumferential direction, of the optical fiber 10, the respective colored sections 11 of the plurality of optical fibers 10 constituting the optical fiber ribbon 1 are formed at least on one surface side (the upper side in the figure) of the optical fiber ribbon 1. This improves visual recognizability of the pattern of the colored sections 11 of the optical fiber ribbon 1.

Further, in the optical fiber ribbon 1 of the embodiments, the colored section of the optical fiber located at an end in the width direction (for example, the first fiber) may be colored by a tracer color. This allows the ribbon number of the optical fiber ribbon 1 to be identified both by the color of the colored section 11 and the pattern, thereby facilitating the worker's identification task.

Further, as illustrated in FIG. 3, in the embodiments, each single piece of optical fiber 10 includes a colored section 11 that is colored by an identification color for identifying that optical fiber 10 from other optical fibers 10, and the colored section 11 is formed by coloring a portion, in the length direction, of the optical fiber according to a predetermined pattern indicating the ribbon number. Thus, even after individual separation, both the fiber number and the ribbon number of the optical fiber 10 can be identified on the basis of the color (identification color) and pattern of the colored section 11 of the optical fiber 10.

{Method for Manufacturing Optical Fiber Ribbon 1}

Figure 7:
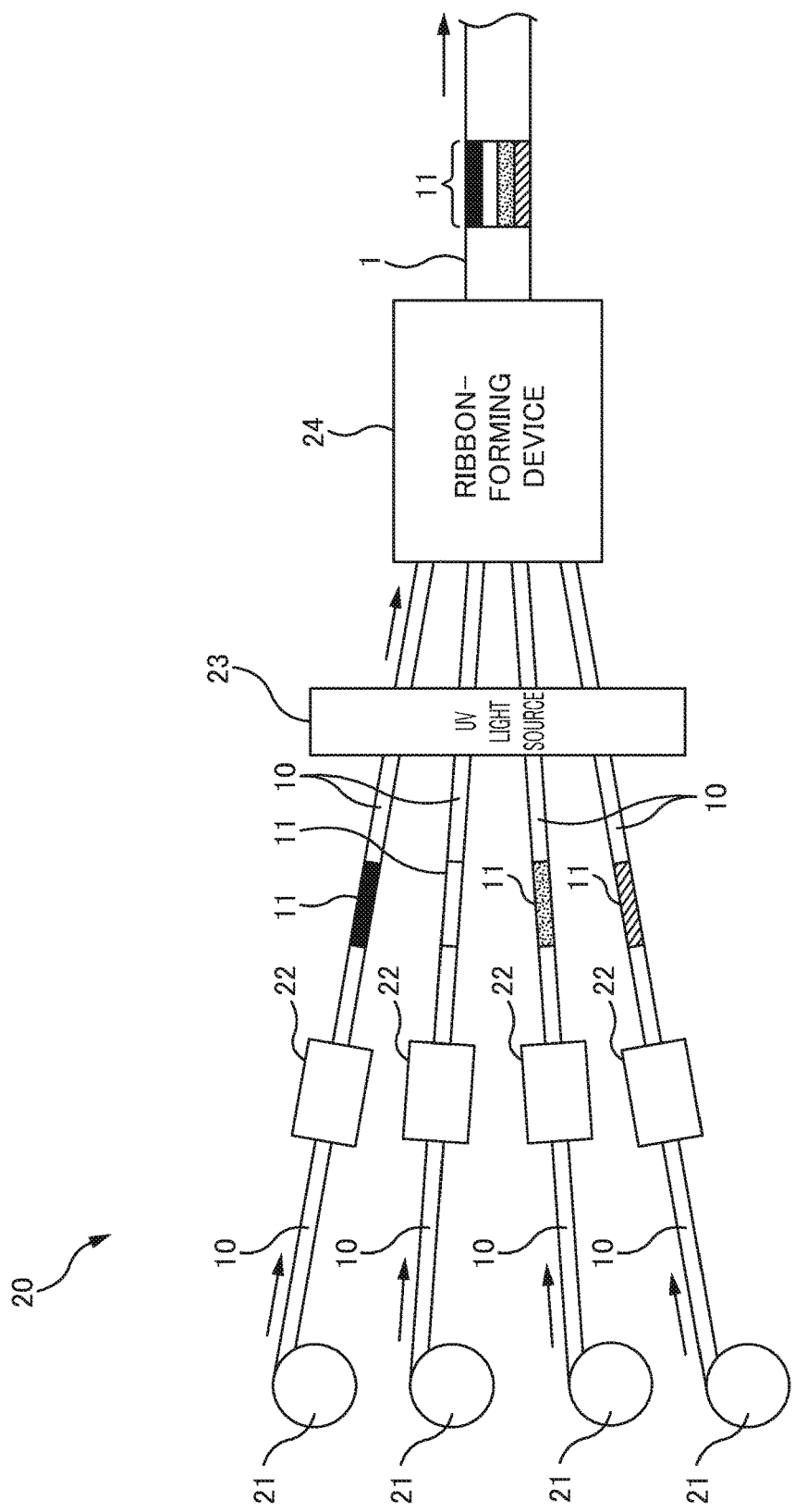
FIG. 7 is a diagram illustrating a manufacturing device 20 for manufacturing an optical fiber ribbon 1.

FIG. 7 is a diagram illustrating a manufacturing device 20 for manufacturing an optical fiber ribbon 1. The manufacturing device 20 includes: a plurality of optical fiber supply units 21 (four in this example); a plurality of printing devices 22; a light source 23; and a ribbon-forming device 24.

The optical fiber supply unit 21 is a supply device (supply source) for supplying an optical fiber 10 to the printing device 22.

The printing device 22 is a device for applying a coloring ink to the outer circumference of the optical fiber 10. In one or more embodiments, the printing device 22 applies a coloring ink to a portion, in the length direction, of the optical fiber 10. In order to apply a coloring ink having a different color (identification color) to each optical fiber 10, a printing device 22 is provided for each optical fiber 10. Herein, the printing device 22 is a roller printing device. By repeatedly transferring the coloring ink adhering to a predetermined circumferential surface of the roller, a specific pattern is repeatedly printed on the optical fiber 10 at predetermined intervals. Herein, the coloring ink is made of a UV-curable resin.

The light source 23 is an irradiation device that irradiates the optical fibers 10 with UV rays. The coloring ink applied to each optical fiber 10 is irradiated with UV rays emitted from the light source 23, and thereby, the coloring ink is cured and the colored section 11 is formed.

The ribbon-forming device 24 is a device for connecting the optical fibers 10 with a ribbon-forming material to form an optical fiber ribbon 1. For example, the ribbon-forming device 24 applies a ribbon-forming material (UV-curable resin) between two adjacent optical fibers 10 and irradiates the ribbon-forming material with UV rays to cure the material and thereby form an intermittently connected optical fiber ribbon 1. Alternatively, the ribbon-forming device 24 may form an intermittently connected optical fiber ribbon 1 by: first applying a ribbon-forming material to the periphery of a plurality of optical fibers 10 arranged side by side; then removing a portion of the applied ribbon-forming material; and then irradiating the material with UV rays. The ribbon-forming material is not limited to UV-curable resins, and other materials, such as thermoplastic resins or other adhesives, may be used.

According to the manufacturing device 20 for manufacturing the optical fiber ribbon 1 of one or more embodiments, the colored section 11 is formed by applying a coloring ink to a portion, in the length direction, of the optical fiber 10. Thus, the amount of coloring ink used can be reduced compared to cases where the coloring ink is applied to the entire region in the length direction of the optical fiber 10.

Further, the embodiments do not include any marks 12' (marking layers) as illustrated in FIGS. 12A to 12C, and thus, a step for forming such marks 12' is unnecessary. This simplifies the manufacturing procedure, and also, manufacturing cost can be reduced as there is no need for marking ink.

Figure 8:
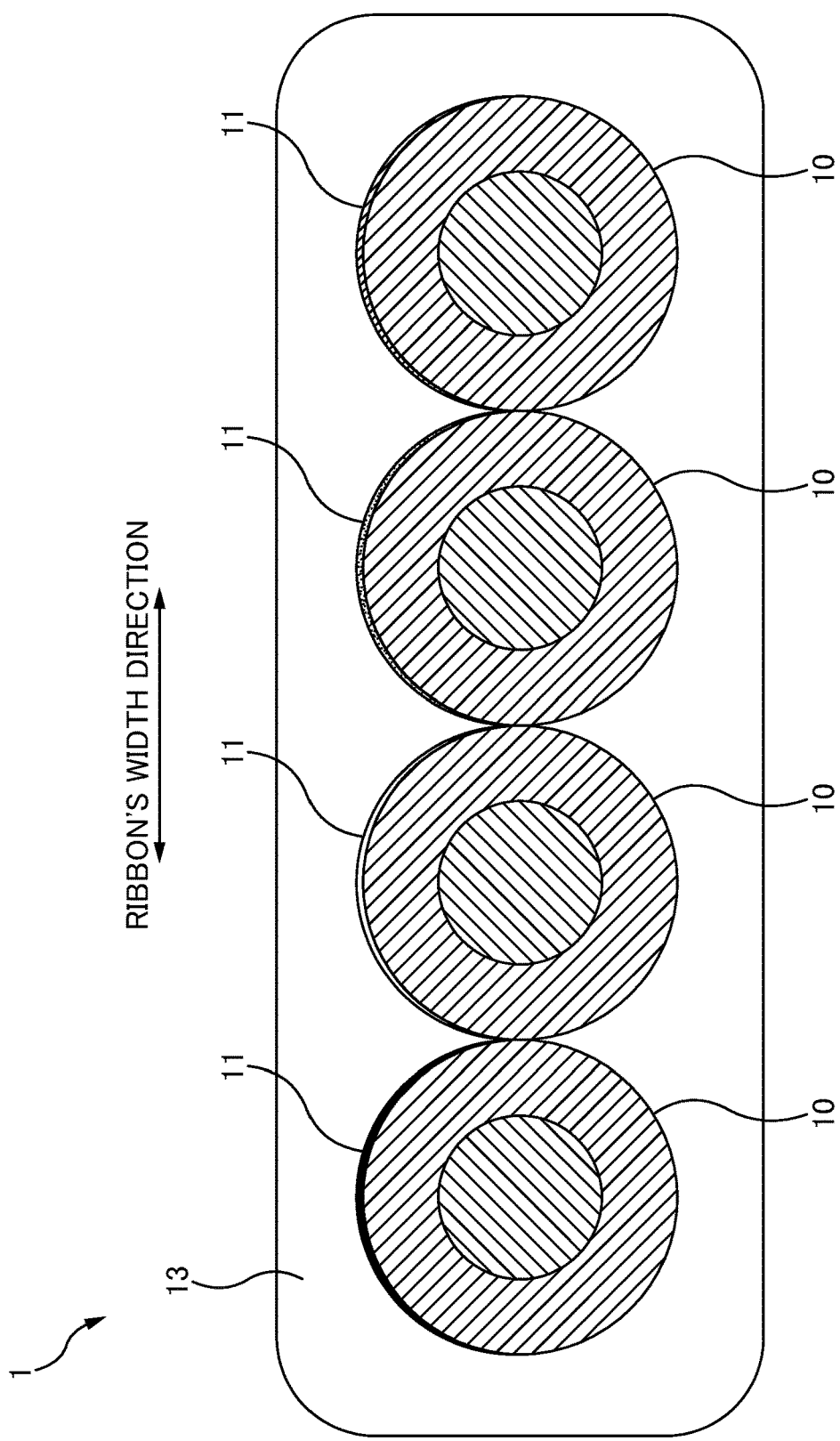
FIG. 8 is a cross-sectional view of another optical fiber ribbon 1.

FIG. 8 is a cross-sectional view of an optical fiber ribbon 1 according to one or more embodiments. This optical fiber ribbon 1 is an optical fiber ribbon wherein a plurality of optical fibers 10 are connected by being collectively covered altogether by a ribbon-forming material 13.

Also in the optical fiber ribbon 1 of one or more embodiments, the respective colored sections 11 are each formed by coloring a portion, in the length direction, of the respective optical fiber according to a common pattern (identification pattern). Thus, in cases where the ribbon-forming material 13 is a transparent/translucent member, the colored sections 11 can be visually recognized through the ribbon-forming material 13. Further, even in cases where the ribbon-forming material 13 is opaque, the colored section 11 of each optical fiber 10 in the optical fiber ribbon 1 can be visually recognized by removing the cover (ribbon-forming material 13) when individually separating a single piece of optical fiber 10. Both the fiber number and the ribbon number of a certain optical fiber 10 can be identified on the basis of the color and pattern of the colored section 11 of that optical fiber 10. Since the coloring area of the colored section 11 is small, the amount of coloring ink used can be reduced.

The optical fiber ribbon 1 of one or more embodiments is manufactured by: extruding a thermoplastic resin, which becomes the ribbon-forming material, by the ribbon-forming device 24 of FIG. 7 and covering, by extrusion molding, the periphery of the plurality of optical fibers 10 arranged side by side; and then curing the thermoplastic resin covering the fibers. It should be noted that, in some embodiments, an intermittently connected optical fiber ribbon 1 can be made by removing a portion of a temporarily applied ribbon-forming material and then irradiating the ribbon-forming material with UV rays, whereas the optical fiber ribbon 1 of the other embodiments can be manufactured by omitting the step of removing a portion of the ribbon-forming material.

Figure 9:
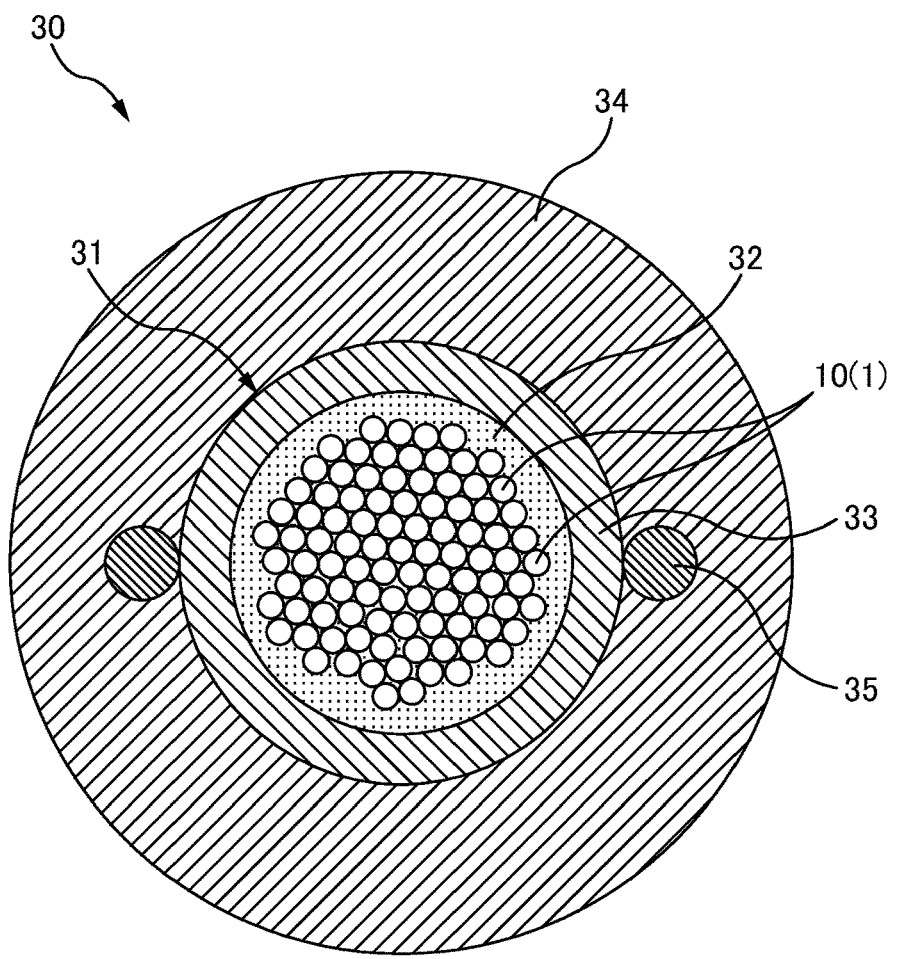
FIG. 9 is a cross-sectional view of an optical fiber cable 30 according to one or more embodiments.

FIG. 9 is a cross-sectional view of an optical fiber cable 30 according to one or more embodiments. This optical fiber cable 30 is a center loose tube-type cable. The optical fiber cable 30 includes a loose tube 31, an outer sheath 34, and two tension members 35 (tensile members). The loose tube 31 is arranged inside the outer sheath 34 so as to be sandwiched between the two tension members 35. Note that the optical fiber cable 30 may include a plurality of loose tubes 31. The loose tube 31 includes a plurality of optical fibers 10, a gel 32, and a tube 33. The plurality of optical fibers 10 are constituted by a plurality of intermittently connected optical fiber ribbons 1.

Each optical fiber ribbon 1 inside the loose tube 31 includes colored sections 11 that are colored according to a pattern for identifying that ribbon from the other optical fiber ribbons 1, as in the above embodiments (see FIG. 2). Thus, a worker can identify the respective ribbon numbers of the plurality of optical fiber ribbons 1 inside the loose tube 31 on the basis of the respective patterns of the colored sections 11 of the optical fiber ribbons 1.

Figure 10:
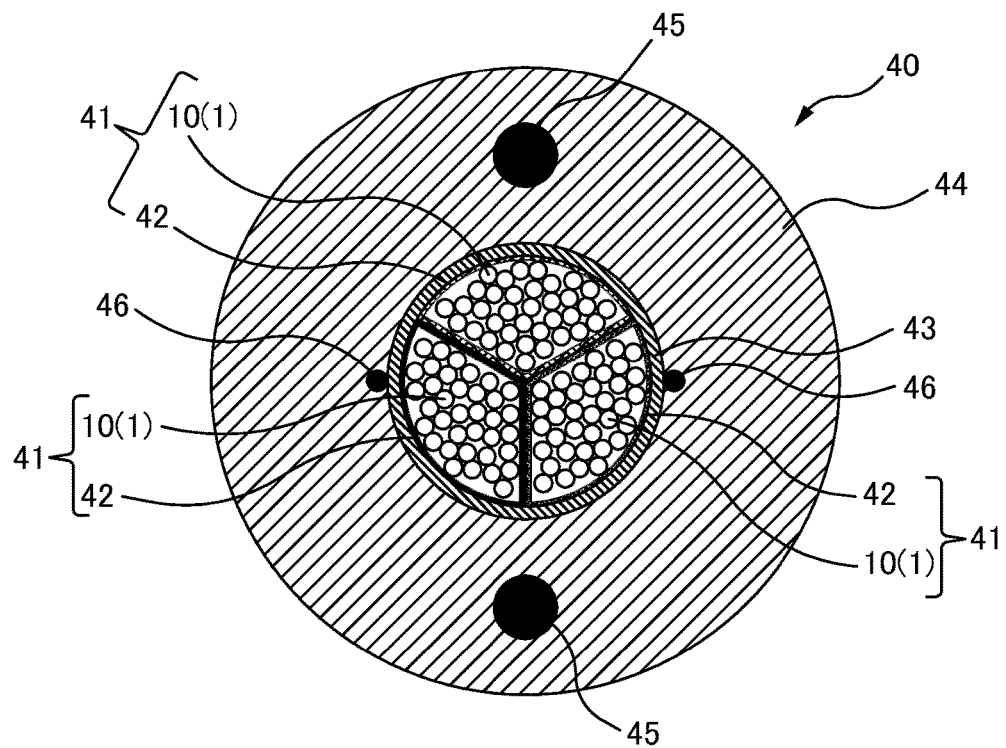
FIG. 10 is a cross-sectional view of another optical fiber cable 40.

FIG. 10 is a cross-sectional view of another optical fiber cable 40. In this optical fiber cable 40, a plurality of optical fiber units 41 (three in this example) are covered by a wrapping tape 43, and the outside thereof is covered by an outer sheath 44. Tension members 45 and rip cords 46 are embedded in the outer sheath 44.

Figure 11A:
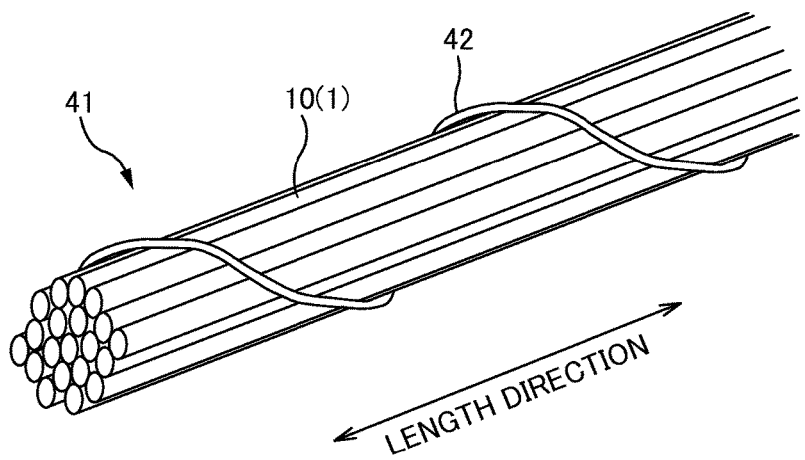
FIGS. 11A to 11C are diagrams illustrating configuration examples of optical fiber units 41 to be used in the optical fiber cable 40.
Figure 11B:
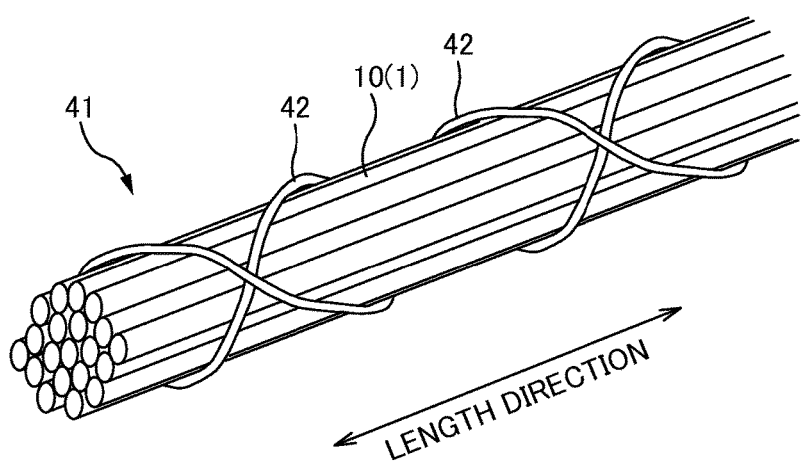
Figure 11C:
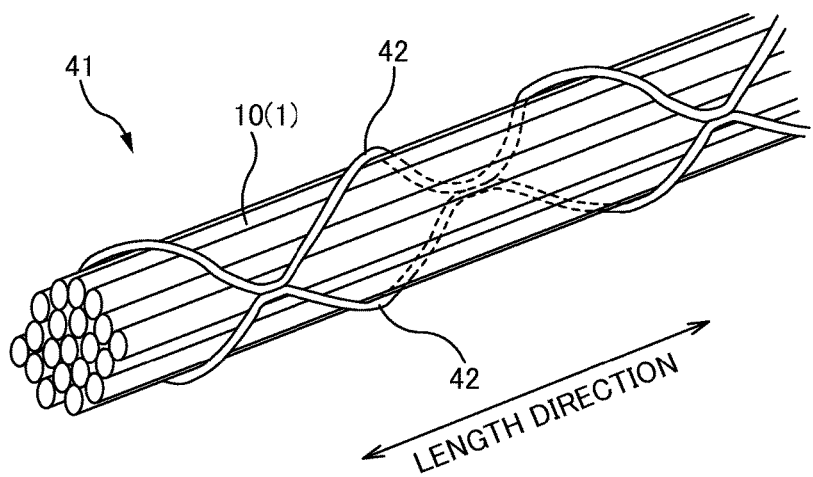

FIGS. 11A to 11C are diagrams illustrating configuration examples of optical fiber units 41 to be used in the optical fiber cable 40. The optical fiber unit 41 has a structure in which a plurality of optical fiber ribbons 1 are bundled by a bundling member 42. The bundling member 42 is wound on the outer circumference of a bundle of optical fiber ribbons 1 (a bundle of optical fibers 10). In the optical fiber unit 41 illustrated in FIG. 11A, a single bundling member 42 is wound helically in one direction. There may, however, be two or more bundling members 42 (see FIGS. 11B and 11C). In cases of winding two bundling members 42 helically in one direction, the two bundling members 42 are wound in opposite directions, as illustrated in FIG. 11B. In cases where the two bundling members 42 are wound in opposite directions as illustrated in FIG. 11B, the two bundling members 42 may be joined at the intersection points between the bundling members 42. As illustrated in FIGS. 11A and 11B, in cases where the bundling member(s) 42 is/are wound helically in one direction on the outer circumference of the optical fiber bundle, there is a need to helically retrieve the bundling member 42 or cut the bundling member 42 when extracting an optical fiber ribbon 1 or an optical fiber 10 from the optical fiber unit 41, which makes the extraction task burdensome. (It takes time to unwind the helically wound bundling member 42.) In contrast, in the optical fiber unit 42 illustrated in FIG. 11C, the bundling members 42 are wound on the outer circumference of the optical fiber bundle along the optical fiber bundle's length direction while alternately inverting their winding directions, and the bundling members 42 are joined together at sections where the winding directions are inverted. With this configuration, the bundling members 42 covering the outer circumference of the optical fiber bundle in a mesh form can be opened simply by separating the joined points at the inversion sections, thereby facilitating extraction of optical fiber ribbons 1 or optical fibers 10 from the optical fiber unit 41.

Each optical fiber ribbon 1 in the optical fiber unit 41 includes colored sections 11 that are colored according to a pattern for identifying that ribbon from the other optical fiber ribbons 1, as in the above embodiments (see FIG. 2). Thus, a worker can identify the respective ribbon numbers of the plurality of optical fiber ribbons 1 inside the optical fiber unit 41 on the basis of the respective patterns of the colored sections 11 of the optical fiber ribbons 1.

The respective bundling members 42 of the three optical fiber units 41 in the optical fiber cable 40 are colored by different colors from one another to enable identification of each optical fiber unit from the other optical fiber units 41. Note that, instead of varying the colors of the bundling members 42, identification patterns may be printed on the respective bundling members 42. In this way, a worker can identify the unit number of each of the optical fiber units 41 in the optical fiber cable 40 simply by looking at the bundling member 42 of the optical fiber unit 41.

The optical fiber cables are not limited to the cables illustrated in FIGS. 9 and 10. Further, the optical fiber ribbons 1 to be used in the optical fiber cable are not limited to intermittently connected optical fiber ribbons 1. For example, a slotted-type optical fiber cable may be configured by using an optical fiber ribbon 1 in which a plurality of optical fibers 10 are connected by being collectively covered altogether by a ribbon-forming material, as in the above embodiments.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Intermittently connected optical fiber ribbon;
1A: Connection part;
1B: Non-connected part;
10: Optical fiber;
10A: Glass fiber;
10B: Cover layer;
11: Colored section;
11': Colored layer (comparative example);
12': Mark (comparative example);
13: Cover (ribbon-forming material);
20: Manufacturing device;
21: Optical fiber supply unit;
22: Printing device;
23: Light source;
24: Ribbon-forming device;
30: Optical fiber cable;
31: Loose tube;
32: Gel;
33: Tube;
34: Outer sheath;
35: Tension member;
40: Another optical fiber cable;
41: Optical fiber unit;
42: Bundling member;
43: Wrapping tape;
44: Outer sheath;
45: Tension member;
46: Rip cord.

The invention claimed is:

1. An optical fiber ribbon comprising:
a plurality of optical fibers arranged side by side in a width direction, wherein
each of the optical fibers includes a colored section that is colored by an identification color for identifying the optical fiber from the other optical fibers; and
the respective colored sections of the optical fibers are formed by coloring a portion, in a length direction, of the respective optical fibers according to a common pattern.

2. The optical fiber ribbon according to claim 1, wherein the respective colored sections of the respective optical fibers are arranged side by side in the width direction.

3. The optical fiber ribbon according to claim 1, wherein the respective colored sections are formed in a portion, in a circumferential direction, of the respective optical fibers.

4. The optical fiber ribbon according to claim 3, wherein
each of the optical fibers includes a cover layer formed of a light-transmissive material; and
the colored section is formed on the cover layer.

5. The optical fiber ribbon according to claim 3, wherein the respective colored sections of the respective optical fibers are formed at least on one surface side of the optical fiber ribbon.

6. The optical fiber ribbon according to claim 1, wherein, among the plurality of optical fibers, the colored section of the optical fiber located at an end in the width direction is colored by a tracer color.

7. An optical fiber cable comprising:

a plurality of optical fiber ribbons, wherein each of the optical fiber ribbons includes a plurality of optical fibers arranged side by side in a width direction, each of the optical fibers including a colored section that is colored by an identification color for identifying the optical fiber from the other optical fibers constituting the same optical fiber ribbon, and the respective colored sections of the optical fibers are formed by coloring a portion, in a length direction, of the respective optical fibers constituting the same optical fiber ribbon according to a pattern for identifying the optical fiber ribbon from the other optical fiber ribbons.

8. An optical fiber comprising:

a colored section that is colored by an identification color for identifying the optical fiber from other optical fibers, wherein the colored section is formed by coloring a portion, in a length direction, of the optical fiber according to a predetermined pattern indicating a ribbon number.

9. The optical fiber according to claim 8, wherein the colored section is formed in a portion, in a circumferential direction, of the optical fiber.

10. The optical fiber according to claim 9, wherein the optical fiber includes a cover layer formed of a light-transmissive material, and the colored section is formed on the cover layer.

11. The optical fiber ribbon according to claim 2, wherein the respective colored sections are formed in a portion, in a circumferential direction, of the respective optical fibers.

12. The optical fiber ribbon according to claim 2, wherein, among the plurality of optical fibers, the colored section of the optical fiber located at an end in the width direction is colored by a tracer color.

* * * * *